(No Model.) 2 Sheets—Sheet 1.
P. W. MacKENZIE.
APPARATUS FOR THE MANUFACTURE OF ILLUMINATING GAS.
No. 435,070. Patented Aug. 26, 1890.
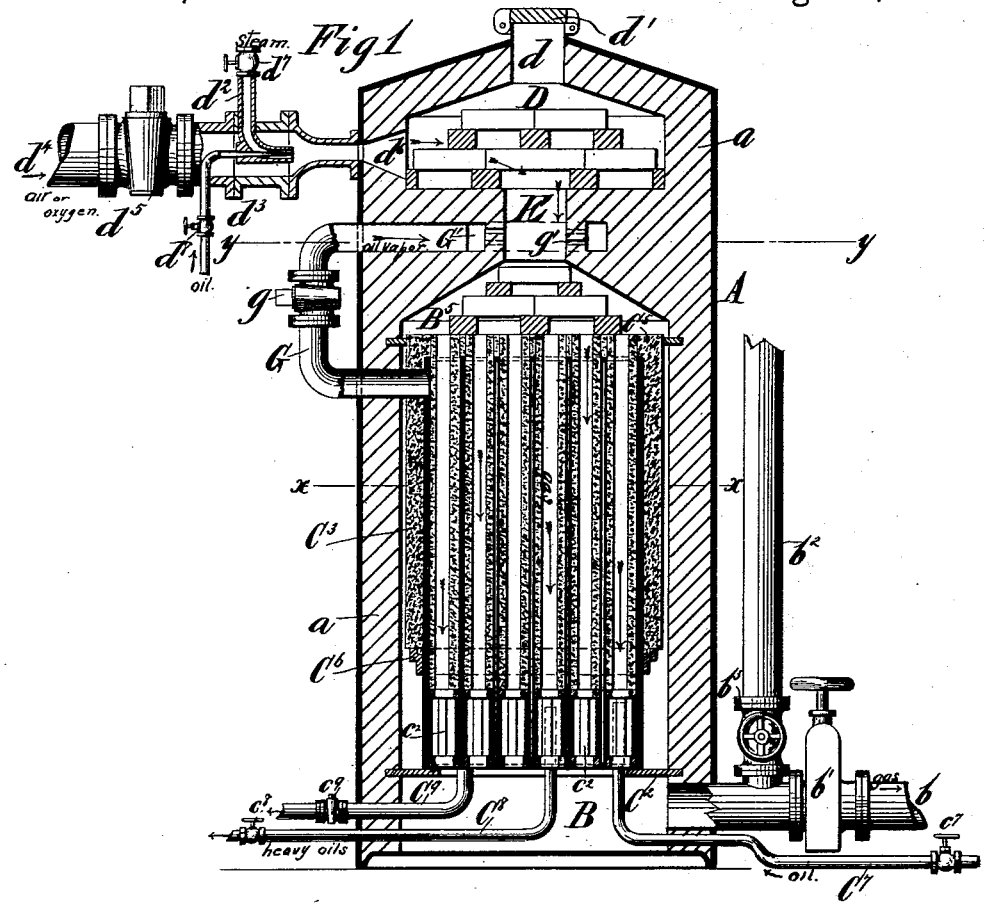
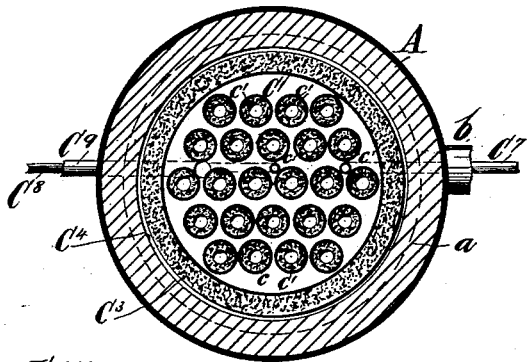
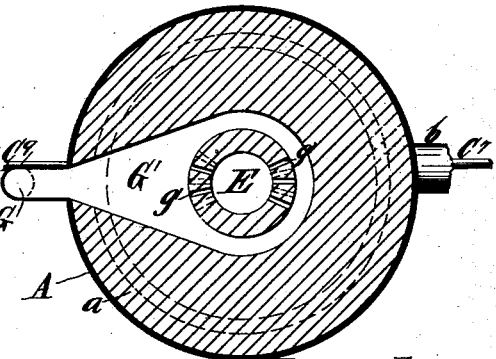
Witnesses:
Inventor:
Philip W. Mackenzie
by his Attorneys
Brown & Griswold

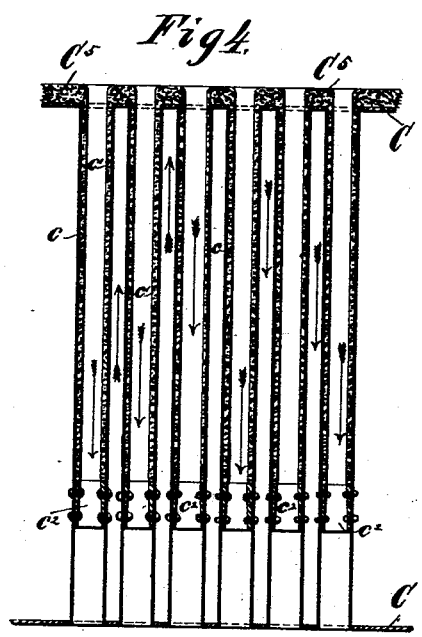

UNITED STATES PATENT OFFICE.

PHILIP W. MACKENZIE, OF NEW YORK, N. Y., ASSIGNOR TO THE FUEL GAS AND LIGHT IMPROVEMENT COMPANY OF AMERICA, OF SAME PLACE.

APPARATUS FOR THE MANUFACTURE OF ILLUMINATING-GAS.

SPECIFICATION forming part of Letters Patent No. 435,070, dated August 26, 1890.

Application filed December 7, 1889. Serial No. 332,942. (No model.)

*To all whom it may concern:*

Be it known that I, PHILIP W. MACKENZIE, of New York, in the county and State of New York, have invented a certain new and useful Improvement in Apparatus for the Manufacture of Illuminating-Gas, of which the following is a specification.

My invention relates to apparatus for the manufacture of illuminating-gas from liquid hydrocarbon, water in the form of steam and oxygen or air, which gas consists, particularly, of hydrogen, carbonic oxide, marsh-gas, and carbon.

I will describe in detail apparatus embodying my improvement, and then point out the novel features in claims.

In the accompanying drawings, Figure 1 is a vertical section of apparatus embodying my improvement. Fig. 2 is a horizontal section taken on the line $x\ x$, Fig. 1. Fig. 3 is a horizontal section taken on the line $y\ y$, Fig. 1. Fig. 4 is a vertical section of certain pipes, showing a modification.

Similar letters of reference designate corresponding parts in all the figures.

A designates the main shell or body of the apparatus. As shown, this shell is cylindrical, and it may be made of metal.

Within the shell A, and forming a lining $a$ therefor, is placed fire-brick or any other suitable refractory material of any desired thickness.

In the lower portion of the body there is formed a chamber B, into which chamber the permanent gas after having been manufactured is received, and from which it may be discharged through an outlet-pipe $b$, provided with a suitable valve $b'$. I have shown as extending from the pipe $b$ a stack $b^2$, provided with a valve or damper $b^3$.

Above the chamber B is an evaporator and superheater C. This evaporator and superheater comprise, as here shown, a number of vertically-extending cylindrical tubes $c$, a sufficient number of such tubes being employed to nearly fill the space in which they are inclosed by the refractory material $a$. All of the tubes are inclosed in a cylindrical shell C', which shell is provided with a tube-sheet at both its upper and lower ends. The tubes $c$ extend through said tube-sheets and are secured therein. I have shown the shell C' as supported near its lower end upon a plate $C^2$, which plate is in turn secured in the refractory material $a$. Surrounding the shell C', but stopping short of the lower end of said shell, is a casing of refractory material $C^3$, an annular space $C^4$ being left between the refractory material $C^3$ and the refractory material $a$. Refractory material $C^5$ also extends over the upper end of the evaporator and superheater C. The refractory material $C^5$, however, constitutes in effect a tube-sheet, as will be presently described. The lower end of the refractory material $C^3$ is supported, as shown, upon an annular flange $C^6$, extending about the shell C' and secured to the latter.

Each of the tubes $c$ is internally lined with refractory material $c'$, which material may be of fire-clay and is of course tubular. These linings of refractory material do not extend wholly to the lower ends of the tubes $c$, but their upper ends extend beyond the upper ends of the tubes $c$ and through the apertures in the tube-sheet formed by the refractory material $C^5$. As shown in Fig. 1, the lower ends of the refractory linings $c'$ are supported upon metallic thimbles or cages $c^2$, which thimbles or cages are driven into the lower ends of the tubes $c$. The tubes open at their lower ends into the chamber B and at their upper ends into a chamber $B^5$. Gaseous products in their highly-heated condition pass downwardly through the tubes $c$. The internal linings of refractory material protect the tubes and prevent their being quickly burned out while the refractory material $C^3$ $C^5$ protects the shell C'. The bottom of the shell C' forms also the bottom of a receptacle for hydrocarbon and other oils. Hydrocarbon oils are admitted through a pipe $C^7$, provided with a cock $c^7$. The pipe $C^7$ extends upwardly for a considerable distance inside the receptacle. A pipe $C^8$ also extends into the receptacle, but terminates at its upper end at a point lower down than the upper end of the pipe $C^7$. The pipe $C^8$ is provided with a cock $c^8$. Through a pipe $C^9$, provided with a cock $c^9$, residual products may be drawn off. This product may contain lubricating-oil and paraffine, and it may be reduced to a heavy carbon tar for ordinary uses. As the pipe $C^8$ terminates below the upper end of the pipe $C^7$, an oil of heavier quality than that entering through the pipe $C^7$ may be drawn off, which oil may be used for lubricating purposes. I am by these means enabled to take off the entire by-product in the manufacture of gas, which by-product or products may be treated for the different elements contained.

The evaporation of hydrocarbon oil in the superheater, which may be utilized in the manufacture of gas, equals about seventy to ninety per cent., and the remaining portion, about ten to thirty per cent., would be taken away as by-products, as above stated. Hydrocarbon oil delivered into the receptacle fills or partly fills the space between the lower ends of the refractory linings $c'$ and the bottom of the shell $C'$, and when evaporated passes upwardly through the spaces in the shell $C'$ which are intermediate of the tubes $c$, in manner about to be described.

D designates a converter or decomposing chamber located in the upper portion of the case or body of the apparatus. This converter is covered by a top or crown of sufficient thickness to prevent loss of heat by radiation, and is provided with an outlet $d$ upon its upper side, which may be closed by a cap or cover $d'$.

Into the converter D, I inject a mixture of liquid hydrocarbon, superheated steam, and oxygen or air. I prefer to introduce this mixture by means of an injector comprising a pipe $d^2$, provided with a cock $d^7$. The steam is preferably superheated. With the injector communicates a pipe $d^3$, provided with a cock $d^8$, and through which the liquid hydrocarbon is drawn by the entering steam. At the same time oxygen or air in suitable quantities is drawn in through a pipe $d^4$, in which is a cock $d^5$. The mixing of the hydrocarbon steam and air or oxygen occurs outside the converter D and enters the latter through an opening or tuyere $d^6$ in a thoroughly mixed condition.

In starting the apparatus the cover $d'$ is raised and the mixed hydrocarbon steam and air or oxygen is ignited. When thoroughly ignited, the cover $d'$ is closed and combustion then takes place in the converter. The intensely-heated products of combustion pass downwardly through a contracted neck or passage E, forming a mixing-chamber and located about centrally in the bottom of the converter and communicating at its lower end with the chamber $B^5$ about the evaporator and superheater C. At this time the valve $b'$ in the pipe $b$ is closed and the valve or damper $b^3$ in the stack $b^2$ is open. The products of combustion from the chamber F pass downwardly through the tubes $c$, thence into the chamber B below the evaporator and superheater, from which they are carried off through the stack $b^2$. This preliminary operation is for the purpose of thoroughly heating the converter D and the evaporator and superheater C, and in carrying it out I prefer to use only a limited amount of steam and a certain amount of hydrocarbon. A proper degree of heat having been obtained I somewhat increase the supply of steam and liquid hydrocarbon. Liquid hydrocarbon is at this time admitted through the pipe $C^7$ to the receptacle in any desired quantity. The superheated hydrocarbon vapor then passes upwardly about the tubes $c$, and thence through a pipe G, provided with a cock $g$, into a vapor-chamber $G'$, surrounding the mixing-chamber E, and communicating with the latter through a number of openings or tuyeres $g'$.

The mixing-chamber E and vapor-chamber $G'$ constitute in effect a carburetor and carbonizer, whereby the lean gas from the converter or decomposing-chamber is enriched by the hot hydrocarbon vapors from the evaporator and superheater.

In the converter D the oxygen or the oxygen of the air and steam combine with the carbon of the liquid hydrocarbon to produce combustion and decomposition, thereby liberating the hydrogen from the steam and hydrocarbon by decomposition, whereby carbonic acid and hydrogen are produced.

Additional carbon or hydrocarbon admitted through the pipe $d^3$ absorbs the oxygen from the carbonic acid, thereby forming carbonic oxide. If this additional carbon or hydrocarbon were not thus introduced, however, the carbonic acid would be absorbed while the gas from the converter was passing through the mixing-chamber E, there producing the same result. The highly-superheated carbon vapors from the evaporator and superheater are delivered in fine jets through the passages or tuyeres $g'$ into the hydrogen and carbonic oxide descending from the converter. The hydrocarbon vapor by being thus thrown in atomized contact with those gases while they are incandescent or at a very high temperature undergoes destructive distillation and is converted into a permanent gas. The highly-superheated carbon vapor may be taken from the pipe G directly into the pipe $d^3$ and the supply of liquid hydrocarbon cut off from the pipe $d^3$, if desired. The only supply of carbon will then be the vapor.

In the example of my improvement shown, so-called "checker-work," which may be of bricks of fire-clay, is employed both in the converter or decomposing-chamber D, and also in the chamber $B^5$. The checker-work in the converter or decomposing-chamber is to prevent the combustible mixture from passing through the carburetor before being converted into a permanent gas and before being subjected to hydrocarbon vapor. The checker-work in chamber $B^5$ is to cause a breaking up or diffusion of the permanent gas, so that it will pass downwardly in even proportions through the tubes $c$. If any carbon should remain unconverted, it may be condensed out by an ordinary condenser and used over again.

In Fig. 4 tapering metallic rings are shown as employed instead of the thimbles or cages $c^2$. These rings are riveted to the tubes. In this case the refractory linings may be shorter than in the example shown in Fig. 1. When nitrogen is present or produced, as when air is used, it is neutralized by the hydrocarbon. The permanent gas is conveyed away through the pipe $b$, the valve $b'$ being of course open and the valve or damper $d^3$ of the stack being closed, and is there washed, scrubbed, purified, and otherwise treated in the usual manner.

More than one injector for introducing hydrocarbon steam and oxygen or air to the chamber may be used, if desired.

Although I have represented the apparatus as extending vertically, so that products of combustion pass downwardly, it might of course be arranged in other positions and such products be otherwise directed.

What I claim as my invention, and desire to secure by Letters Patent, is—

1. In an apparatus for manufacturing illuminating-gas, the combination, with a shell or body, of an evaporator and superheater located therein and comprising metallic pipes, linings for said pipes composed of refractory material through which heated gaseous products may pass, a metallic shell in which said pipes are contained, a covering of refractory material external to said shell, a converter and decomposing-chamber within said shell, a carburetor and carbonizer intermediate of the evaporator and superheater and the converter and decomposing-chamber, a pipe or passage between the evaporator and superheater and the carburetor and carbonizer, a communication between the carburetor and carbonizer and the converter and decomposing-chamber, a passage for steam, hydrocarbon, and oxygen or air opening into the converter and decomposing-chamber, and an outlet for permanent gas below the evaporator and superheater, substantially as specified.

2. In an apparatus for manufacturing illuminating-gas, the combination, with a shell or body, of an evaporator and superheater located therein and comprising a number of pipes through which heated gaseous products will pass, a converter and decomposing-chamber within said shell, a carburetor and carbonizer intermediate of the evaporator and superheater and the converter and decomposing-chamber, a pipe or passage affording communication between the evaporator and superheater and the carburetor and carbonizer, a communication between the carburetor and carbonizer and the converter and decomposing-chamber, a chamber intermediate of the carburetor and carbonizer and the evaporator and superheater, a passage for steam, hydrocarbon, and oxygen or air communicating with said converter or decomposing-chamber, refractory material in both said converter and decomposing-chamber and the chamber between the carburetor and carbonizer and the evaporator and superheater, and an outlet for permanent gas from the evaporator and superheater, substantially as specified.

3. In an apparatus for manufacturing illuminating-gas, the combination, with a shell or body, of an evaporator and superheater located therein and comprising a number of pipes through which heated gaseous products will pass, a receptacle for hydrocarbon oils at the lower portion of said evaporator and superheater, an inlet-pipe for hydrocarbon oil opening into said receptacle, an outlet-pipe for heavy or lubricating oils also opening into said receptacle, but at a lower level than the upper end of said inlet-pipe, and another outlet-pipe for residual products, also opening into said receptacle, but at a lower level than the upper end of the outlet-pipe first named, substantially as and for the purpose specified.

PHILIP W. MACKENZIE.

Witnesses:
FREDK. HAYNES,
D. H. HAYWOOD.